(12) United States Patent
Patton et al.

(10) Patent No.: US 11,755,443 B2
(45) Date of Patent: Sep. 12, 2023

(54) SYSTEM FOR PERFORMING AN AUTONOMOUS WIDGET OPERATION

(71) Applicant: Dell Products L.P., Round Rock, TX (US)

(72) Inventors: Margaret Patton, Austin, TX (US); Saurav Shrestha, Round Rock, TX (US); Carlin Mendonca, Austin, TX (US); Jeffrey M. Lairsey, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 133 days.

(21) Appl. No.: 17/371,880

(22) Filed: Jul. 9, 2021

(65) Prior Publication Data

US 2023/0007881 A1   Jan. 12, 2023

(51) Int. Cl.
*G06F 3/0482* (2013.01)
*G06F 11/30* (2006.01)

(52) U.S. Cl.
CPC ........ *G06F 11/3055* (2013.01); *G06F 3/0482* (2013.01); *G06F 11/3003* (2013.01)

(58) Field of Classification Search
CPC . G06F 11/3055; G06F 3/0482; G06F 11/3003
See application file for complete search history.

(56) References Cited

U.S. PATENT DOCUMENTS

| | | | |
|---|---|---|---|
| 9,619,531 B2* | 4/2017 | Wu | G06F 16/248 |
| 11,461,350 B1* | 10/2022 | Madheswaran | G06F 16/285 |
| 2021/0157653 A1* | 5/2021 | Nair | G06F 11/3058 |
| 2022/0270463 A1* | 8/2022 | Brown | G08B 21/12 |

* cited by examiner

*Primary Examiner* — Anil K Bhargava
(74) *Attorney, Agent, or Firm* — Terrile, Cannatti & Chambers; Stephen A. Terrile

(57) ABSTRACT

A system, method, and computer-readable medium are disclosed for performing a data center monitoring and management operation. The data center monitoring and management operation includes: monitoring data center assets within a data center; identifying an issue within the data center, the issue being associated with an operational situation associated with a particular component of the data center; determining whether data associated with the issue corresponds to predefined conditional criteria; and, triggering an autonomous widget operation in response to a determination of the data associated with the issue corresponding to the predefined conditional criteria, the autonomous widget operation executing a particular autonomous widget.

14 Claims, 7 Drawing Sheets

SYSTEM FOR PERFORMING AN AUTONOMOUS WIDGET OPERATION

BACKGROUND OF THE INVENTION

Field of the Invention

The present invention relates to information handling systems. More specifically, embodiments of the invention relate to performing a data center system monitoring and management operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing a data center monitoring and management operation, comprising: monitoring data center assets within a data center; identifying an issue within the data center, the issue being associated with an operational situation associated with a particular component of the data center; determining whether data associated with the issue corresponds to predefined conditional criteria; and, triggering an autonomous widget operation in response to a determination of the data associated with the issue corresponding to the predefined conditional criteria, the autonomous widget operation executing a particular autonomous widget.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: monitoring data center assets within a data center; identifying an issue within the data center, the issue being associated with an operational situation associated with a particular component of the data center; determining whether data associated with the issue corresponds to predefined conditional criteria; and, triggering an autonomous widget operation in response to a determination of the data associated with the issue corresponding to the predefined conditional criteria, the autonomous widget operation executing a particular autonomous widget.

In another embodiment the invention relates to a computer-readable storage medium embodying computer program code, the computer program code comprising computer executable instructions configured for: monitoring data center assets within a data center; identifying an issue within the data center, the issue being associated with an operational situation associated with a particular component of the data center; determining whether data associated with the issue corresponds to predefined conditional criteria; and, triggering an autonomous widget operation in response to a determination of the data associated with the issue corresponding to the predefined conditional criteria, the autonomous widget operation executing a particular autonomous widget.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
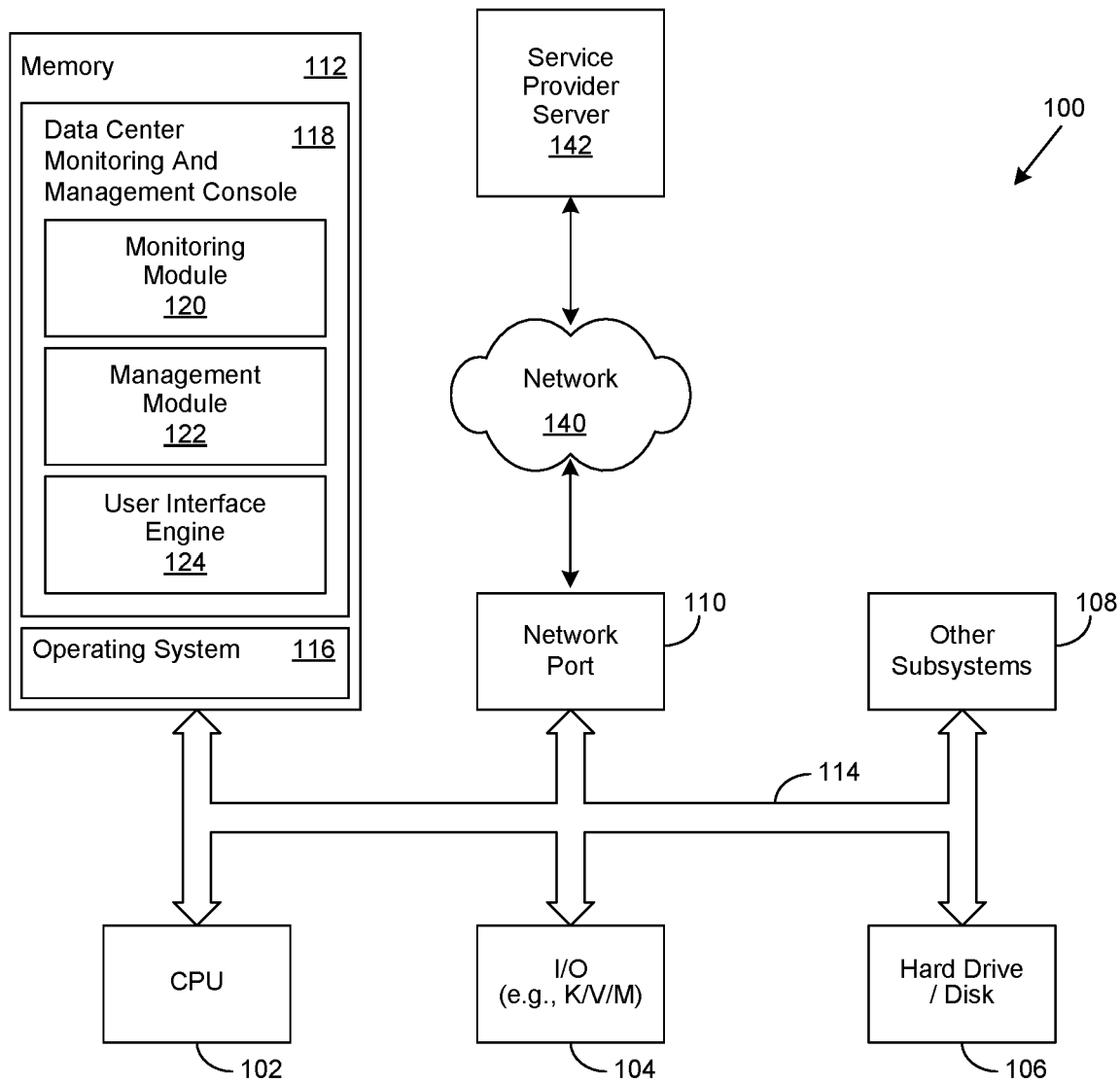
FIG. 1 shows a general illustration of components of an information handling system as implemented in the system and method of the present invention.

A system, method, and computer-readable medium are disclosed for performing a data center system monitoring and management operation. Various aspects of the invention reflect an appreciation that it is common for a typical datacenter to monitor and manage many different assets, such as certain computing and networking devices, described in greater detail herein. Certain aspects of the invention likewise reflect an appreciation that such data center assets are typically implemented to work in combination with one another for a particular purpose. Likewise, various aspects of the invention reflect an appreciation that such purposes generally involve the performance of a wide variety of tasks, operations, and processes to service certain workloads.

Certain aspects of the invention reflect an appreciation that the graphical presentation of quantitative information can often facilitate the monitoring and management of data center assets. Certain aspects of the invention likewise reflect an appreciation that such graphical representations are commonly provided in the form of one or more widgets, which can be displayed within the user interface (UI) of a data center management console. However, certain aspects of the invention reflect an appreciation that such widgets are typically static, based upon a supposition of what the user may want to see, or events that have happened in the past, as opposed to accommodating unexpected events.

In addition, certain aspects of the invention reflect an appreciation that it is not uncommon for a data center management console to only have a standardized set of widgets. Furthermore, in many cases these standardized widgets lack the ability to be displayed dynamically in response to the occurrence of a particular event. Likewise, it is uncommon for the widgets used by a data center management console to be customized by the user to accommodate their specialized needs.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a data center monitoring and management console 118. In one embodiment, the information handling system 100 is able to download the data center monitoring and management console 118 from the service provider server 142. In another embodiment, the data center monitoring and management console 118 is provided as a service from the service provider server 142.

In certain embodiments, the data center monitoring and management console 118 may include a monitoring module 120, a management module 122, and a user interface engine 124, or a combination thereof. In certain embodiments, the data center monitoring and management console 118 may be implemented to perform a data center monitoring and management operation. In certain embodiments, the data center monitoring and management operation may be performed during operation of an information handling system 100. In various embodiments, performance of the data center monitoring and management operation may result in the realization of improved monitoring and management of certain data center assets, as described in greater detail herein.

Figure 2:
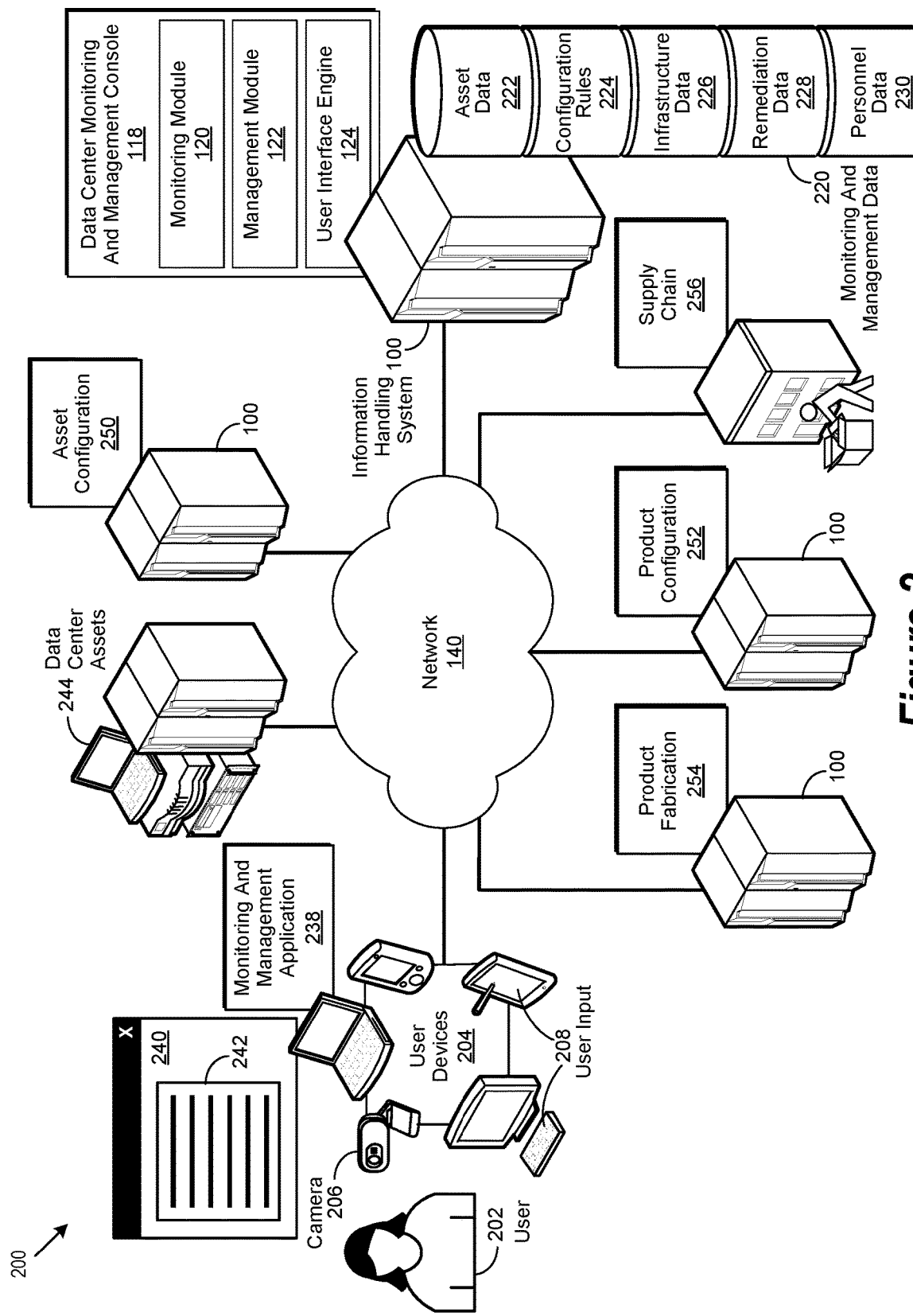
FIG. 2 shows a block diagram of a data center system monitoring and management environment.

FIG. 2 is a simplified block diagram of a data center monitoring and management environment implemented in accordance with an embodiment of the invention. As used herein, a data center broadly refers to a building, a dedicated space within a building, or a group of buildings, used to house a collection of interrelated data center assets 244 implemented to work in combination with one another for a particular purpose. As likewise used herein, a data center asset 244 broadly refers to anything tangible, or intangible, that can be owned, controlled, or enabled to produce value as a result of its use within a data center. In certain embodiments, a data center asset 244 may include a product, or a service, or a combination of the two.

As used herein, a tangible data center asset 244 broadly refers to data center asset 244 having a physical substance, such as a computing or network device. Examples of computing devices may include personal computers (PCs), laptop PCs, tablet computers, servers, mainframe computers, Redundant Arrays of Independent Disks (RAID) storage units, their associated internal and external components, and so forth. Likewise, examples of network devices may include routers, switches, hubs, repeaters, bridges, gateways, and so forth. Other examples of a tangible data center asset 244 may include certain data center personnel, such as a data center system administrator, operator, or technician, and so forth. Other examples of a tangible data center asset 244 may include certain maintenance, repair, and operations (MRO) items, such as replacement and upgrade parts for a particular data center asset 244. In certain embodiments, such MRO items may be in the form of consumables, such as air filters, fuses, fasteners, and so forth.

As likewise used herein, an intangible data center asset 244 broadly refers to a data center asset 244 that lacks physical substance. Examples of intangible data center assets 244 may include software, firmware, and other non-physical, computer-based assets. Other examples of intangible data center assets 244 may include digital assets, such as structured and unstructured data of all kinds, still images, video images, audio recordings of speech, and other sounds, and so forth. Further examples of intangible data center assets 244 may include intellectual property, such as patents, trademarks, copyrights, trade names, franchises, goodwill, and knowledge resources, such as data center asset 244 documentation. Yet other examples of intangible data center assets 244 may include certain tasks, functions, operations, procedures, or processes performed by data center personnel. Those of skill in the art will recognize that many such examples of tangible and intangible data center assets 244 are possible. Accordingly, the foregoing is not intended to limit the spirit, scope or intent of the invention.

In certain embodiments, the value produced by a data center asset 244 may be tangible or intangible. As used herein, tangible value broadly refers to value that can be measured. Examples of tangible value may include return on investment (ROI), total cost of ownership (TCO), internal rate of return (IRR), increased performance, more efficient use of resources, improvement in sales, decreased customer support costs, and so forth. As likewise used herein, intangible value broadly refers to value that provides a benefit that may be difficult to measure. Examples of intangible value may include improvements in user experience, customer support, and market perception. Skilled practitioner of the art will recognize that many such examples of tangible and intangible value are possible. Accordingly, the foregoing is not intended to limit the spirit, scope or intent of the invention.

In certain embodiments, the data center monitoring and management environment 200 may include a data center monitoring and management console 118. In certain embodiments, the data center monitoring and management console 118 may be implemented to perform a data center monitoring and management operation. As used herein, a data center monitoring and management operation broadly refers to any task, function, procedure, or process performed, directly or indirectly, within a data center monitoring and management environment 200 to procure, deploy, configure, implement, operate, monitor, manage, maintain, or remediate a data center asset 244.

In certain embodiments, a data center monitoring and management operation may include a data center monitoring task. As used herein, a data center monitoring task broadly refers to any function, operation, procedure, or process performed, directly or indirectly, within a data center monitoring and management environment 200 to monitor the operational status of a particular data center asset 244. In various embodiments, a particular data center asset 244 may be implemented to generate an alert if its operational status exceeds certain parameters. In these embodiments, the definition of such parameters, and the method by which they may be selected, is a matter of design choice.

For example, an internal cooling fan of a server may begin to fail, which in turn may cause the operational temperature of the server to exceed its rated level. In this example, the server may be implemented to generate an alert, which provides notification of the occurrence of a data center issue. As used herein, a data center issue broadly refers to an operational situation associated with a particular component of a data monitoring and management environment 200, which if not corrected, may result in negative consequences. In certain embodiments, a data center issue may be related to the occurrence, or predicted occurrence, of an anomaly within the data center monitoring and management environment 200. In certain embodiments, the anomaly may be related to unusual or unexpected behavior of one or more data center assets 244.

In certain embodiments, a data center monitoring and management operation may include a data center management task. As used herein, a data center management task broadly refers to any function, operation, procedure, or process performed, directly or indirectly, within a data center monitoring and management environment 200 to manage a particular data center asset 244. In certain embodiments, a data center management task may include a data center deployment operation, a data center remediation operation, a data center remediation documentation operation, or a combination thereof.

As used herein, a data center deployment operation broadly refers to any function, task, procedure, or process performed, directly or indirectly, within a data center monitoring and management environment 200 to install a software file, such as a configuration file, a new software application, a version of an operating system, and so forth, on a data center asset 244. As likewise used herein, a data center remediation operation broadly refers to any function, task, procedure, or process performed, directly or indirectly, within a data center monitoring and management environment 200 to correct an operational situation associated with a component of a data monitoring and management environment 200, which if not corrected, may result in negative consequences. A data center remediation documentation operation, as likewise used herein, broadly refers to any function, task, procedure, or process performed, directly or indirectly, within a data center monitoring and management environment 200 to retrieve, generate, revise, update, or store remediation documentation that may be used in the performance of a data center remediation operation.

In certain embodiments, the data center monitoring and management console 118 may be implemented to receive an alert corresponding to a particular data center issue. In various embodiments, the data center monitoring and management console 118 may be implemented to receive certain data associated with the operation of a particular data center asset 244. In certain embodiments, such operational data may be received through the use of telemetry approaches familiar to those of skill in the art. In various embodiments, the data center monitoring console 118 may be implemented to process certain operational data received from a particular data center asset to determine whether a data center issue has occurred, is occurring, or is anticipated to occur.

In certain embodiments, the data center monitoring and management console 118 may be implemented to include a monitoring module 120, a management monitor 122, and a user interface (UI) engine 124, or a combination thereof. In certain embodiments, the monitoring module 120 may be implemented to monitor the procurement, deployment, implementation, operation, management, maintenance, or remediation of a particular data center asset 244 at any point in its lifecycle. In certain embodiments, the management module 122 may be implemented to manage the procurement, deployment, implementation, operation, monitoring, maintenance, or remediation of a particular data center asset 244 at any point in its lifecycle. In various embodiments, the UI engine 124 may be implemented to generate a UI for the provision, or receipt, of certain information associated with the monitoring, or management, of a particular data center asset 244. In various embodiments, some combination of the monitoring module 120, the management module 122 and the UI engine 124 may be implemented to perform an autonomous widget operation, described in greater detail herein.

In certain embodiments, the data center monitoring and management environment 200 may include a repository of data center monitoring and management data 220. In certain embodiments, the repository of data center monitoring and management data 220 may be local to the information handling system 100 executing the data center monitoring and management console 118 or may be located remotely. In various embodiments, the repository of data center monitoring and management data 220 may include certain information associated with data center asset data 222, data center asset configuration rules 224, data center infrastructure data 226, data center remediation data 228, and data center personnel data 230.

As used herein, data center asset data 222 broadly refers to information associated with a particular data center asset 244, such as an information handling system 100, which can be read, measured, and structured into a usable format. For example, data center asset data 222 associated with a particular server may include the number and type of processors it can support, their speed and architecture, minimum and maximum amounts of memory supported, various storage configurations, the number, type, and speed of input/output channels and ports, and so forth. In various embodiments, the data center asset data 222 may likewise include certain performance and configuration information associated with a particular workload, as described in greater detail herein. In various embodiments, the data center asset data 222 may include certain public or proprietary information related to data center asset 244 configurations associated with a particular workload.

In certain embodiments, the data center asset data 222 may include information associated with data center asset 244 types, quantities, locations, use types, optimization types, workloads, performance, support information, and cost factors, or a combination thereof, as described in greater detail herein. In certain embodiments, the data center asset data 222 may include information associated with data center asset 222 utilization patterns, likewise described in greater detail herein. In certain embodiments, the data center asset data 222 may include information associated with the allocation of certain data center asset resources, described in greater detail herein, to a particular workload.

As likewise used herein, a data center asset configuration rule 224 broadly refers to a rule used to configure a particular data center asset 244. In certain embodiments, one or more data center asset configuration rules 224 may be used to verify that a particular data center asset 244 configuration is the most optimal for an associated location, or workload, or to interact with other data center assets 244, or a combination thereof, as described in greater detail herein. In certain embodiments, the data center asset configuration rule 224 may be used in the performance of a data center asset configuration verification operation, a data center remediation operation, or a combination of the two. In certain embodiments, the data center asset configuration verification operation, or the data center remediation operation, or both, may be performed by an asset configuration system 250. In certain embodiments, the asset configuration system 250 may be used in combination with the data center monitoring and management console 118 to perform a data center asset configuration operation, or a data center remediation operation, or a combination of the two.

As used herein, data center infrastructure 226 data broadly refers to any data associated with a data center infrastructure component. As likewise used herein, a data center infrastructure component broadly refers to any component of a data center monitoring and management environment 200 that may be involved, directly or indirectly, in the procurement, deployment, implementation, configuration, operation, monitoring, management, maintenance, or remediation of a particular data center asset 244. In certain embodiments, data center infrastructure components may include physical structures, such as buildings, equipment racks and enclosures, network and electrical cabling, heating, cooling, and ventilation (HVAC) equipment and associated ductwork, electrical transformers and power conditioning systems, water pumps and piping systems, smoke and fire suppression systems, physical security systems and associated peripherals, and so forth. In various embodiments, data center infrastructure components may likewise include the provision of certain services, such as network connectivity, conditioned airflow, electrical power, and water, or a combination thereof.

Data center remediation data 228, as used herein, broadly refers to any data associated with the performance of a data center remediation operation, described in greater details herein. In certain embodiments, the data center remediation data 228 may include information associated with the remediation of a particular data center issue, such as the date and time an alert was received indicating the occurrence of the data center issue. In certain embodiments, the data center remediation data 228 may likewise include the amount of elapsed time before a corresponding data center remediation operation was begun after receiving the alert, and the amount of elapsed time before it was completed. In various embodiments, the data center remediation data 228 may include information related to certain data center issues, the frequency of their occurrence, their respective causes, error codes associated with such data center issues, the respective location of each data center asset 244 associated with such data center issues, and so forth.

In various embodiments, the data center remediation data 228 may include information associated with data center asset 244 replacement parts, or upgrades, or certain third party services that may need to be procured in order to perform the data center remediation operation. Likewise, in certain embodiments, related data center remediation data 228 may include the amount of elapsed time before the replacement parts, or data center asset 244 upgrades, or third party services were received and implemented. In certain embodiments, the data center remediation data 228 may include information associated with data center personnel who may have performed a particular data center remediation operation. Likewise, in certain embodiments, related data center remediation data 228 may include the amount of time the data center personnel actually spent performing the operation, issues encountered in performing the operation, and the eventual outcome of the operation that was performed.

In certain embodiments, the data center remediation data 228 may include remediation documentation associated with a particular data center asset 244. In various embodiments, such remediation documentation may include information associated with certain attributes, features, characteristics, functional capabilities, operational parameters, and so forth, of a particular data center asset 244. In certain embodiments, such remediation documentation may likewise include information, such as step-by-step procedures and associated instructions, video tutorials, diagnostic routines and tests, checklists, and so forth, associated with remediating a particular data center issue.

In certain embodiments, the data center remediation data 228 may include information associated with any related remediation dependencies, such as other data center remediation operations that may need to be performed beforehand. In certain embodiments, the data center remediation data 228 may include certain time restrictions when a data center remediation operation, such as rebooting a particular server, may be performed. In various embodiments, the data center remediation data 228 may likewise include certain autonomous remediation rules, described in greater detail herein. In various embodiments, certain of these autonomous remediation rules may be used in the performance of an autonomous remediation operation, described in greater detail herein. Those of skill in the art will recognize that many such examples of data center remediation data 228 are possible. Accordingly, the foregoing is not intended to limit the spirit, scope, or intent of the invention.

Data center personnel data 230, as used herein, broadly refers to any data associated with data center personnel who may be directly, or indirectly, involved in the procurement, deployment, configuration, implementation, operation, monitoring, management, maintenance, or remediation of a particular data center asset 244. In various embodiments, the data center personnel data 230 may include job title, work assignment, or responsibility information corresponding to certain data center personnel. In various embodiments, the data center personnel data 230 may include information related to the type, and number, of data center remediation operations currently being, or previously, performed by certain data center personnel. In various embodiments, the data center personnel data 230 may include historical information, such as success metrics, associated with data center remediation operations performed by certain data center personnel, such as data center administrators, operators, and technicians. In these embodiments, the data center personnel data 230 may be updated as individual data center personnel complete each data center remediation task, described in greater detail herein, they are assigned.

In various embodiments, the data center personnel data 230 may likewise include education, certification, and skill level information corresponding to certain data center personnel. Likewise, in various embodiments, the data center personnel data 230 may include security-related information, such as security clearances, user IDs, passwords, security-related biometrics, authorizations, and so forth, corresponding to certain data center personnel. Those of skill in the art will recognize that many such examples of data center personnel data 230 are possible. Accordingly, the foregoing is not intended to limit the spirit, scope, or intent of the invention.

In certain embodiments, various data center assets 244 within a data center monitoring and management environment 200 may have certain interdependencies. As an example, a data center monitoring and management environment 200 may have multiple servers interconnected by a storage area network (SAN) providing block-level access to various disk arrays and tape libraries. In this example, the servers, various physical and operational elements of the SAN, as well the disk arrays and tape libraries, are interdependent upon one another.

In certain embodiments, each data center asset 244 in a data center monitoring and management environment 200 may be treated as a separate data center asset 244 and depreciated individually according to their respective attributes. As an example, a particular rack of servers in a data center monitoring and management environment 200 may be made up of a variety of individual servers, each of which may have a different depreciation schedule. To continue the example, certain of these data center assets 244 may be implemented in different combinations to produce an end result. To further illustrate the example, a particular server in the rack of servers may initially be implemented to query a database of customer records. As another example, the same server may be implemented at later time perform a sales analysis of sales associated with those same customer records.

In certain embodiments, each data center asset 244 in a data center monitoring and management environment 200 may have an associated maintenance schedule and service contract. For example, a data center monitoring and management environment 200 may include a wide variety of servers and storage arrays, which may respectively be manufactured by a variety of manufacturers. In this example, the frequency and nature of scheduled maintenance, as well as service contract terms and conditions, may be different for each server and storage array. In certain embodiments, the individual data center assets 244 in a data center monitoring and management environment 200 may be configured differently, according to their intended use. To continue the previous example, various servers may be configured with faster or additional processors for one intended workload, while other servers may be configured with additional memory for other intended workloads. Likewise, certain storage arrays may be configured as one RAID configuration, while others may be configured as a different RAID configuration.

In certain embodiments, the data center monitoring and management environment 200 may likewise be implemented to include an asset configuration system 250, a product configuration system 252, a product fabrication system 254, and a supply chain system 256, or a combination thereof. In various embodiments, the asset configuration system 250 may be implemented to perform certain data center asset 244 configuration operations. In certain embodiments, the data center asset 244 configuration operation may be performed to configure a particular data center asset 244 for a particular purpose. In certain embodiments, the data center monitoring and management console 118 may be implemented to interact with the asset configuration system 250 to perform a particular data center asset 244 configuration operation. In various embodiments, the asset configuration system 250 may be implemented to generate, manage, and provide, or some combination thereof, data center asset configuration rules 224. In certain of these embodiments, the data center asset configuration rules 224 may be used to configure a particular data center asset 244 for a particular purpose.

In certain embodiments, a user 202 may use a user device 204 to interact with the data center monitoring and management console 118. As used herein, a user device 204 refers to an information handling system such as a personal computer, a laptop computer, a tablet computer, a personal digital assistant (PDA), a smart phone, a mobile telephone, or other device that is capable of processing and communicating data. In certain embodiments, the communication of the data may take place in real-time or near-real-time. As used herein, real-time broadly refers to processing and providing information within a time interval brief enough to not be discernable by a user 202.

In certain embodiments, a user device 204 may be implemented with a camera 206, such as a video camera known to skilled practitioners of the art. In certain embodiments, the camera 206 may be integrated into the user device 204. In certain embodiments, the camera 206 may be implemented as a separate device configured to interoperate with the user device 204. As an example, a webcam familiar to those of skill in the art may be implemented receive and communicate various image and audio signals to a user device 204 via a Universal Serial Bus (USB) interface.

In certain embodiments, the user device 204 may be configured to present a data center monitoring and management console user interface (UI) 240. In certain embodiments, the data center monitoring and management console UI 240 may be implemented to present a graphical representation 242 of data center asset monitoring and management information, which is automatically generated in response to interaction with the data center monitoring and management console 118. In certain embodiments, the UI engine 124 may be implemented to generate the data center monitoring and management console UI 240, or the graphical representation 242 presented therein, or both. In certain embodiments, the UI engine 124 may be implemented to display an autonomous widget, described in greater detail herein, within the data center monitoring and management console UI 240, or the graphical representation 242 presented therein, or both.

In certain embodiments, a data center monitoring and management application 238 may be implemented on a particular user device 204. In various embodiments, the data center monitoring and management application 238 may be implemented on a mobile user device 204, such as a laptop computer, a tablet computer, a smart phone, a dedicated-purpose mobile device, and so forth. In certain of these embodiments, the mobile user device 204 may be used at various locations within the data center monitoring and management environment 200 by the user 202 when performing a data center monitoring and management operation, described in greater detail herein.

In various embodiments, the data center monitoring and management application 238 may be implemented to facilitate a user 202, such as a data center administrator, operator, or technician, to perform a particular data center remediation operation. In various embodiments, such facilitation may include using the data center monitoring and management application 238 to receive a notification of a data center remediation task, described in greater detail herein, being assigned to the user. In certain embodiments, the data center monitoring and management console 118 may be implemented to generate the notification of the data center remediation task assignment, and assign it to the user, as likewise described in greater detail herein. In certain embodiments, the data center monitoring and management console 118 may be implemented to generate the data center remediation task, and once generated, provide it to the data center monitoring and management application 238 associated with the assigned user 202.

In certain embodiments, such facilitation may include using the data center monitoring and management application 238 to receive the data center remediation task from the data center monitoring and management console 118. In various embodiments, such facilitation may include using the data center monitoring and management application 238 to confirm that the user 202 is at the correct physical location of a particular data center asset 244 associated with a corresponding data center issue. In certain of these embodiments, the data center monitoring and management application 238 may be implemented to include certain Global Positioning System (GPS) capabilities, familiar to those of skill in the art, which may be used to determine the physical location of the user 202 in relation to the physical location of a particular data center asset 244.

In various embodiments, such facilitation may include using the data center monitoring and management application 238 to ensure the user 202 is aware of, or is provided the location of, or receives, or a combination thereof, certain remediation resources, described in greater detail herein, that may be needed to perform a particular data center remediation operation. In various embodiments, such facilitation may include using the data center monitoring and management application 238 to view certain remediation documentation, or augmented instructions, related to performing a particular data center remediation operation. In various embodiments, such facilitation may include using the data center monitoring and management application 238 to certify that a particular data center remediation operation has been performed successfully.

In certain embodiments the UI window 240 may be implemented as a UI window of the data center monitoring and management application 238. In various embodiments, the data center monitoring and management application 238 may be implemented to include, in part or in whole, certain functionalities associated with the data center monitoring and management console 118. In certain embodiments, the data center monitoring and management application 238 may be implemented to interact in combination with the data center monitoring and management console 118, and other components of the data center monitoring and management environment 200, to perform a data center monitoring and management operation.

In certain embodiments, the user device 204 may be used to exchange information between the user 202 and the data center monitoring and management console 118, the data center monitoring and management application 238, the asset configuration system 250, the product configuration system 252, the product fabrication system 254, and the supply chain system 256, or a combination thereof, through the use of a network 140. In various embodiments, the asset configuration system 250 may be implemented to configure a particular data center asset 244 to meet certain performance goals. In various embodiments, the asset configuration system 250 may be implemented to use certain data center monitoring and management data 220, certain data center asset configuration rules 226 it may generate or manage, or a combination thereof, to perform such configurations.

In various embodiments, the product configuration system 252 may be implemented to use certain data center monitoring and management data 220 to optimally configure a particular data center asset 244, such as a server, for an intended workload. In various embodiments, the data center monitoring and management data 220 used by the product configuration system 252 may have been generated as a result of certain data center monitoring and management operations, described in greater detail herein, being performed by the data center monitoring and management console 118. In various embodiments, the product configuration system 252 may be implemented to provide certain product configuration information to a product fabrication system 254. In various embodiments, the product fabrication system 254 may be implemented to provide certain product fabrication information to a product fabrication environment (not shown). In certain embodiments, the product fabrication information may be used by the product fabrication environment to fabricate a product, such as a server, to match a particular data center asset 244 configuration.

In various embodiments, the data center monitoring and management console UI 240 may be presented via a website (not shown). In certain embodiments, the website may be provided by one or more of the data center monitoring and management console 118, the asset configuration system 250, the product configuration system 252, the product fabrication system 254, or the supply chain system 256. In certain embodiments, the supply chain system 256 may be implemented to manage the provision, fulfillment, or deployment of a particular data center asset 244 produced in the product fabrication environment. For the purposes of this disclosure a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input 208 to a web server.

In certain embodiments, the data center monitoring and management console 118 may be implemented to interact with the asset configuration system 250, the product configuration system 252, the product fabrication system 254, and the supply chain or fulfillment system 256, or a combination thereof, each of which in turn may be executing on a separate information handling system 100. In certain embodiments, the data center monitoring and management console 118 may be implemented to interact with the asset configuration system 250, the product configuration system 252, the product fabrication system 254, and the supply chain or fulfillment system 256, or a combination thereof, to perform a data center monitoring and management operation, as described in greater detail herein.

Figure 3:
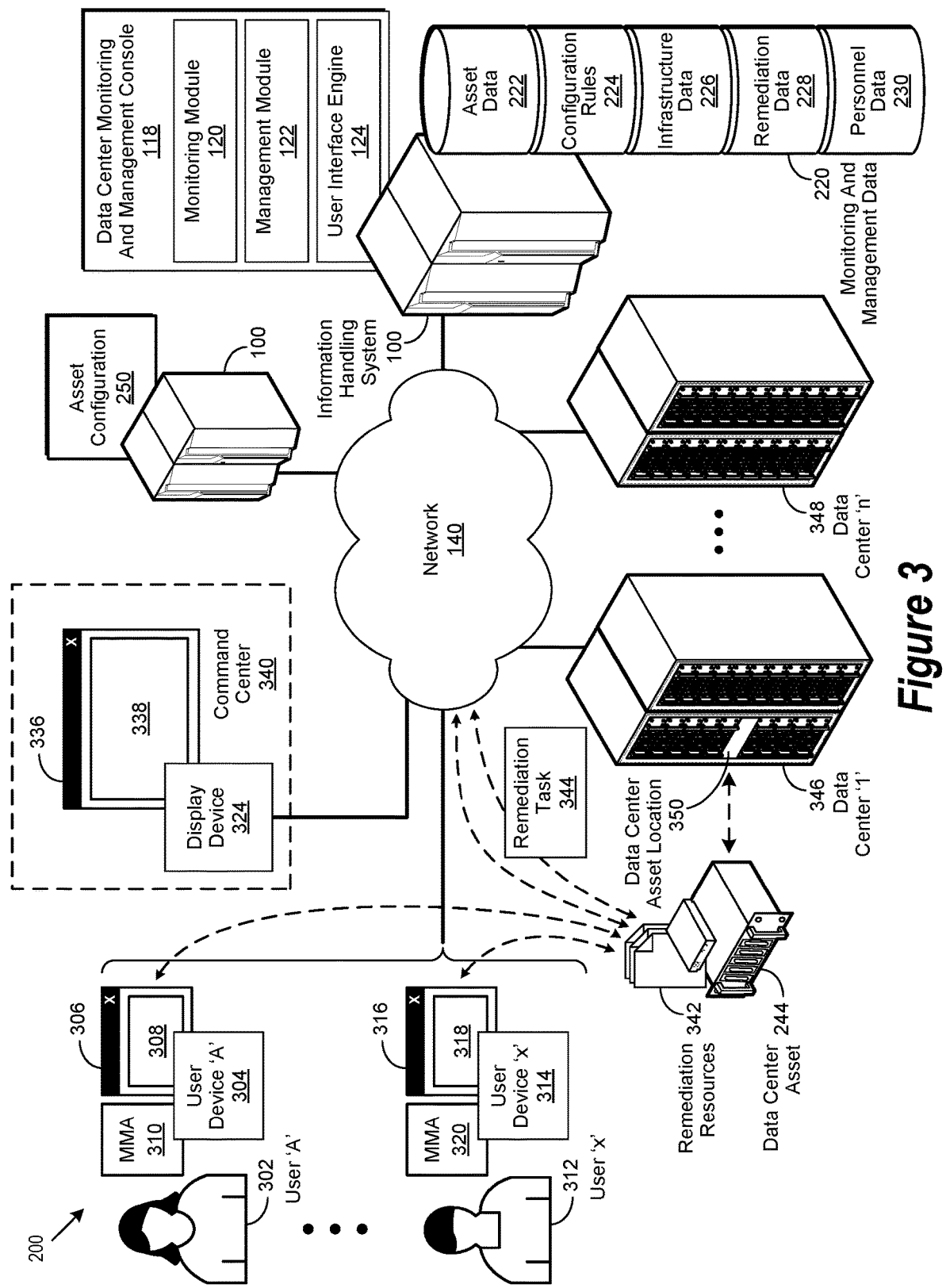
FIG. 3 shows a functional block diagram of the performance of a data center monitoring and management operation.

FIG. 3 shows a functional block diagram of the performance of a data center monitoring and management operation implemented in accordance with an embodiment of the invention. In various embodiments, a data center monitoring and management environment 200, described in greater detail herein, may be implemented to include one or more data centers, such as data centers '1' 346 through 'n' 348. As likewise described in greater detail herein, each of the data centers '1' 346 through 'n' 348 may be implemented to include one or more data center assets 244, likewise described in greater detail herein. In certain embodiments, as described in greater detail herein, the data center monitoring and management environment 200 may be implemented to include a data center monitoring and management console 118. In certain embodiments, the data center monitoring and management console 118 may be implemented to include a monitoring module 120, a management module 122, and a user interface (UI) engine 124, or a combination thereof, as described in greater detail herein.

As described in greater detail herein, the data center monitoring and management console 118 may be implemented in certain embodiments to perform a data center monitoring and management operation. In certain embodiments, the data center monitoring and management console 118 may be implemented to provide a unified framework for the performance of a plurality of data center monitoring and management operations, by a plurality of users, within a common user interface (UI). In certain embodiments, the data center monitoring and management console 118, and other components of the data center monitoring environment 200, such as the asset configuration system 250, may be implemented to be used by a plurality of users, such as users 'A' 302 through 'x' 312 shown in FIG. 3. In various embodiments, certain data center personnel, such as users 'A' 302 through 'x' 312, may respectively interact with the data center monitoring and management console 118, and other components of the data center monitoring and management environment 200, through the use of an associated user device 'A' 304 through 'x' 314.

In certain embodiments, such interactions may be respectively presented to users 'A' 302 through 'x' 312 within a user interface (UI) window 306 through 316, corresponding to user devices 'A' 304 through 'x' 314. In certain embodiments the UI window 306 through 316 may be implemented in a window of a web browser, familiar to skilled practitioners of the art. In certain embodiments, a data center monitoring and management application 310 through 320, described in greater detail herein, may be respectively implemented on user devices 'A' 304 through 'x' 314. In certain embodiments the UI window 306 through 316 may be respectively implemented as a UI window of the data center monitoring and management application 310 through 320. In certain embodiments, the data center monitoring and management application 310 through 320 may be implemented to interact in combination with the data center monitoring and management console 118, and other components of the data center monitoring and management environment 200, to perform a data center monitoring and management operation.

In certain embodiments, the interactions with the data center monitoring and management console 118, and other components of the data center monitoring and management environment 200, may respectively be presented as a graphical representation 308 through 318 within UI windows 306 through 316. In various embodiments, such interactions may be presented to users 'A' 302 through 'x' 312 via a display device 324, such as a projector or large display screen. In certain of these embodiments, the interactions may be presented to users 'A' 302 through 'x' 312 as a graphical representation 338 within a UI window 336.

In certain embodiments, the display device 324 may be implemented in a command center 340, familiar to those of skill in the art, such as a command center 340 typically found in a data center or a network operations center (NOC). In various embodiments, one or more of the users 'A' 302 through 'x' 312 may be located within the command center 340. In certain of these embodiments, the display device 324 may be implemented to be generally viewable by one or more of the users 'A' 302 through 'x' 312.

In certain embodiments, the data center monitoring and management operation may be performed to identify the location 350 of a particular data center asset 244. In certain embodiments, the location 350 of a data center asset 244 may be physical, such as the physical address of its associated data center, a particular room in a building at the physical address, a particular location in an equipment rack in that room, and so forth. In certain embodiments, the location 350 of a data center asset 244 may be non-physical, such as a network address, a domain, a Uniform Resource Locator (URL), a file name in a directory, and so forth.

Certain embodiments of the invention reflect an appreciation that it is not uncommon for large organization to have one or more data centers, such as data centers '1' 346 through 'n' 348. Certain embodiments of the invention reflect an appreciation that it is likewise not uncommon for such data centers to have multiple data center system administrators and data center technicians. Likewise, various embodiments of the invention reflect an appreciation that it is common for a data center system administrator to be responsible for planning, initiating, and overseeing the execution of certain data center monitoring and management operations. Certain embodiments of the invention reflect an appreciation that it is common for a data center system administrator, such as user 'A' 302, to assign a particular data center monitoring and management operation to a data center technician, such as user 'x' 312, as a task to be executed.

Certain embodiments of the invention reflect an appreciation that it is likewise common for a data center administrator, such as user 'A' 302, to assume responsibility for performing a particular data center monitoring and management operation. As an example, a data center administrator may receive a stream of data center alerts, each of which is respectively associated with one or more data center issues. To continue the example, several of the alerts may have an initial priority classification of "critical." However, the administrator may notice that one such alert may be associated with a data center issue that is more critical, or time sensitive, than the others and should be remediated as quickly as possible. Accordingly, the data center administrator may elect to assume responsibility for remediating the data center issue, and as a result, proceed to perform an associated data center remediation operation at that time instead of assigning it to other data center personnel.

Certain embodiments of the invention reflect an appreciation that the number of data center assets 244 in a particular data center 'l' 346 through 'n' 348 may be quite large. Furthermore, it is not unusual for such data center assets 244 to be procured, deployed, configured, and implemented on a scheduled, or as needed, basis. It is likewise common for certain existing data center assets 244 to be replaced, upgraded, reconfigured, maintained, or remediated on a scheduled, or as-needed, basis. Likewise, certain embodiments of the invention reflect an appreciation that such replacements, upgrades, reconfigurations, maintenance, or remediation may be oriented towards hardware, firmware, software, connectivity, or a combination thereof.

For example, a data center system administrator may be responsible for the creation of data asset 244 procurement, deployment, configuration, and implementation templates, firmware update bundles, operating system (OS) and software application stacks, and so forth. Likewise, a data center technician may be responsible for receiving a procured data center asset 244, transporting it to a particular data asset location 350 in a particular data center '1' 346 through 'n' 348, and implementing it in that location 350. The same, or another, data center technician may then be responsible for configuring the data center asset 244, establishing network connectivity, applying configuration files, and so forth. To continue the example, the same, or another, data center administrator or technician may be responsible for remediating hardware issues, such as replacing a disc drive in a server or Redundant Array of Independent Disks (RAID) array, or software issues, such as updating a hardware driver or the version of a server's operating system. Accordingly, certain embodiments of the invention reflect an appreciation that a significant amount of coordination may be needed between data center system administrators and data center technicians to assure efficient and reliable operation of a data center.

In various embodiments, certain data center monitoring and management operations may include a data center remediation operation, described in greater detail herein. In certain embodiments, a data center remediation operation may be performed to remediate a particular data asset 244 issue at a particular data asset location 350 in a particular data center '1' 346 through 'n' 348. In certain embodiments, the data center remediation operation may be performed to ensure that a particular data center asset location 350 in a particular data center '1' 346 through 'n' 348 is available for the replacement or upgrade of an existing data center asset 244. As an example, a data center remediation operation may involve deployment of a replacement server that occupies more rack space than the server it will be replacing.

In various embodiments, the data center monitoring and management console 118, or the data center monitoring and management application 310 through 320, or a combination of the two, may be implemented in a failure tracking mode to capture certain data center asset 244 telemetry. In various embodiments, the data center asset 244 telemetry may include data associated with the occurrence of certain events, such as the failure, or anomalous performance, of a particular data center asset 244 in whole, or in part. In certain embodiments, the data center asset 244 telemetry may be captured incrementally to provide a historical perspective of the occurrence, and evolution, of an associated data center issue.

In various embodiments, the data center monitoring and management console 118 may likewise be implemented generate certain remediation operation notes. For example, the data center monitoring and management console 118 may enter certain data center asset 244 remediation instructions in the data center remediation operation notes. In various embodiments, the data center remediation operation notes may be implemented to contain information related to data center asset 244 replacement or upgrade parts, data center asset 244 files that may be needed, installation and configuration instructions related to such files, the physical location 350 of the data center asset 244, and so forth. In certain embodiments, a remediation task 344 may be generated by associating the previously-generated data center remediation operation notes with the remediation documentation, data center asset files, or other remediation resources 342 most pertinent to the data center issue, and the administrator, and any data center personnel selected or its remediation. As used herein, a data center remediation task 344 broadly refers to one or more data center remediation operations, described in greater detail herein, that can be assigned to one or more users 'A' 302 through 'x' 312.

Certain embodiments of the invention reflect an appreciation that a group of data center personnel, such as users 'A' 302 through 'x' 312, will likely possess different skills, certifications, levels of education, knowledge, experience, and so forth. As a result, remediation documentation that is suitable for certain data center personnel may not be suitable for others. For example, a relatively inexperienced data center administrator may be overwhelmed by a massive volume of detailed and somewhat arcane minutiae related to the configuration and administration of multiple virtual machines (VMs) on a large server. However, such remediation documentation may be exactly what a highly skilled and experienced data center administrator needs to remediate subtle server and VM configuration issues.

Conversely, the same highly skilled and experienced data center administrator may be hampered, or slowed down, by being provided remediation documentation that is too simplistic, generalized, or high-level for the data center issue they may be attempting to remediate. Likewise, an administrator who is moderately skilled in configuring VMs may benefit from having step-by-step instructions, and corresponding checklists, when remediating a VM-related data center issue. Accordingly, as used herein, pertinent remediation documentation broadly refers to remediation documentation applicable to a corresponding data center issue that is most suited to the skills, certifications, level of education, knowledge, experience, and so forth of the data center personnel assigned to its remediation.

In various embodiments, the data center monitoring and management console 118 may be implemented to generate a corresponding notification of the remediation task 344. In certain embodiments, the resulting notification of the remediation task 344 assignment may be provided to the one or more users 'A' 302 through 'x' 312 assigned to perform the remediation task 344. In certain embodiments, the notification of the remediation task 344 assignment may be respectively provided to the one or more users 'A' 302 through 'x' 312 within the UI 306 through 316 of their respective user devices 'A' 304 through 'x' 314. In certain embodiments, the notification of the remediation task 344 assignment, and the remediation task 344 itself, may be implemented such that they are only visible to the users 'A' 302 through 'x' 312 to which it is assigned.

In certain embodiments, the data center monitoring and management console 118 may be implemented to operate in a monitoring mode. As used herein, monitoring mode broadly refers to a mode of operation where certain monitoring information provided by the monitoring and management console 118 is available for use by one or more users 'A' 302 through 'x' 312. In certain embodiments, one or more of the users 'A' 302 through 'x' 312 may be command center 340 users. In certain embodiments, the data center monitoring and management console 118 may be implemented to operate in a management mode. As used herein, management mode broadly refers to a mode of operation where certain operational functionality of the data center monitoring and management console 118 is available for use by a user, such as users 'A' 302 through 'x' 312.

Figure 4A:
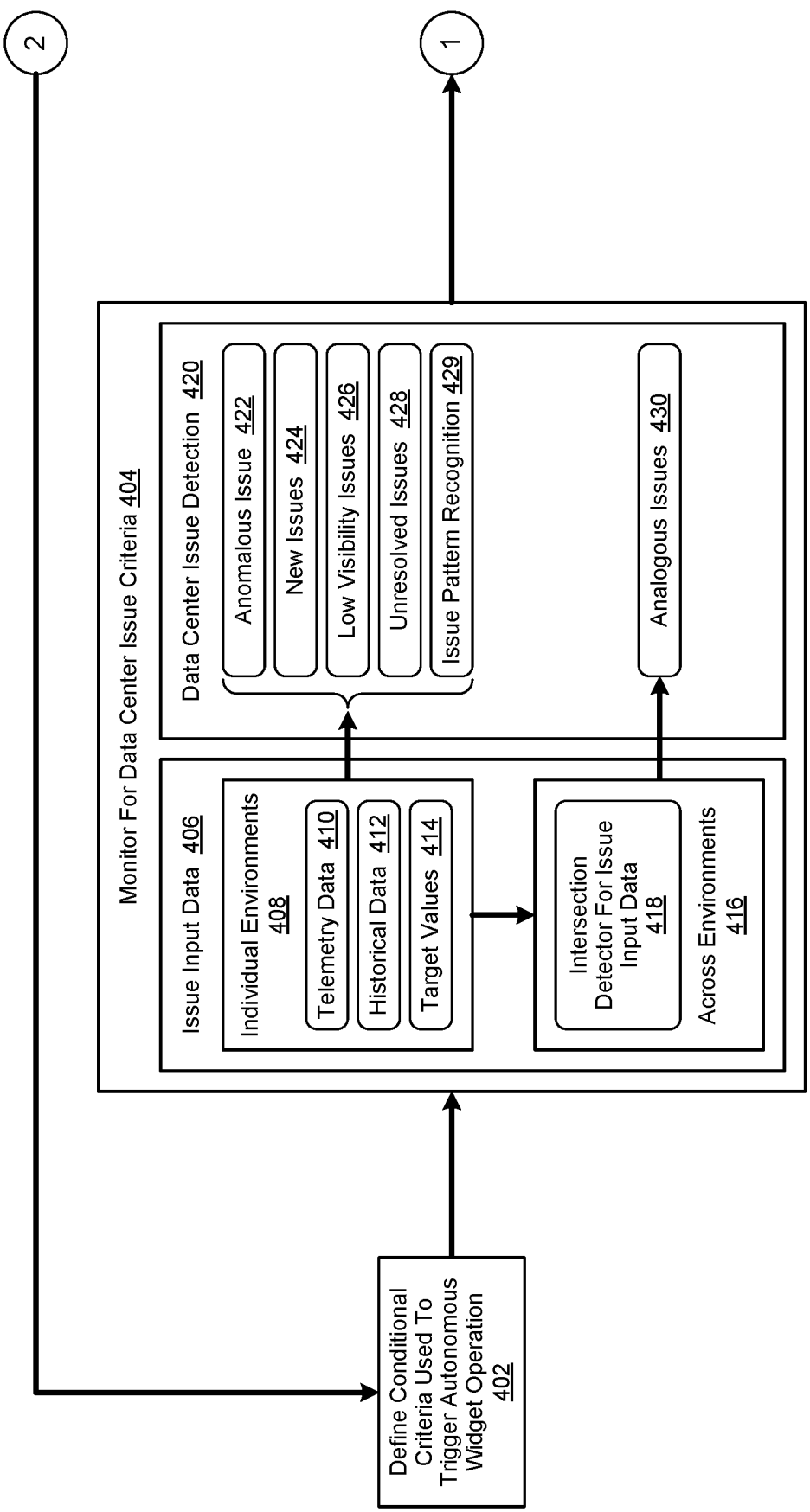
FIGS. 4a and 4b are a simplified process flow diagram showing the performance of autonomous widget operations.
Figure 4B:
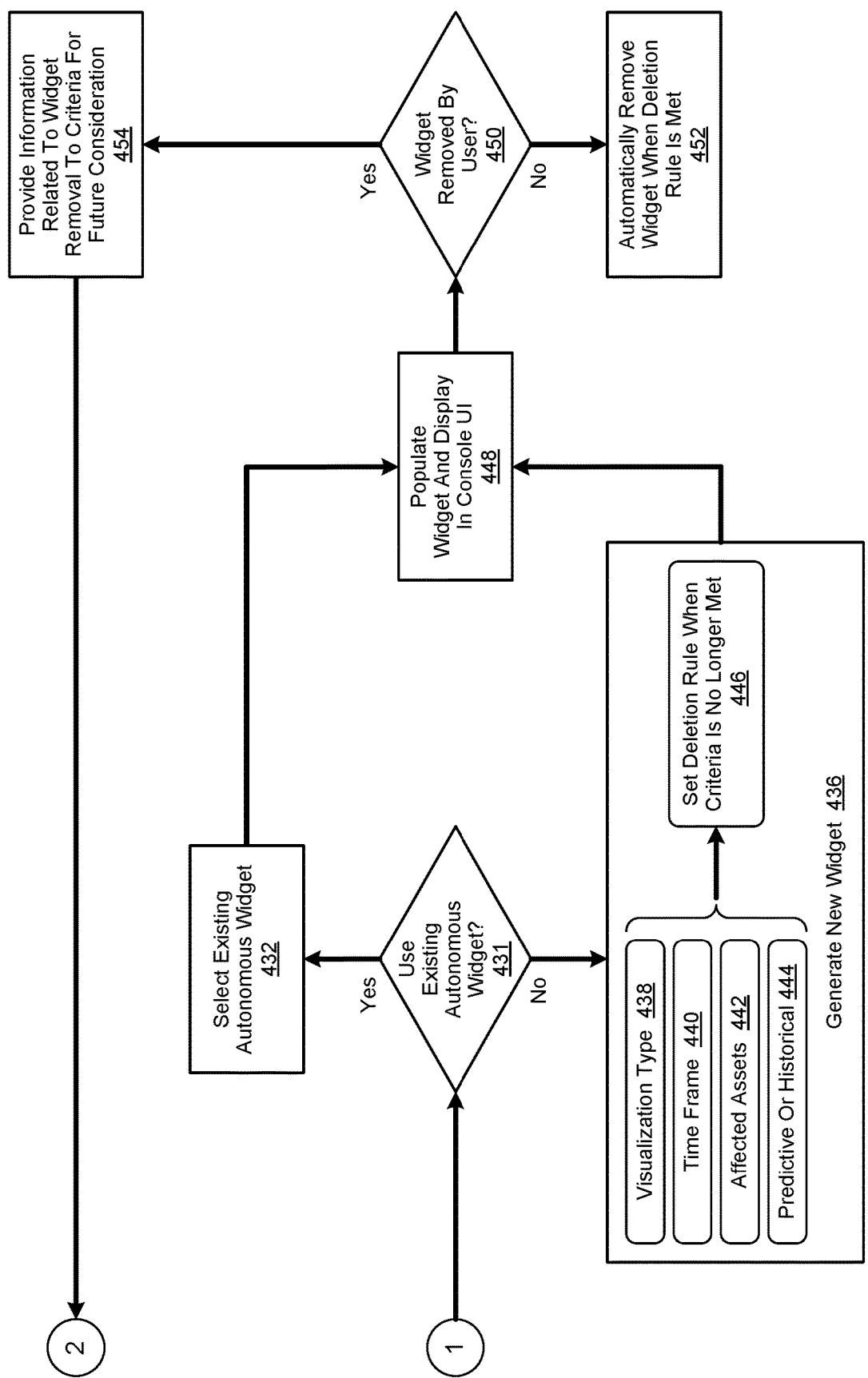

FIGS. 4a and 4b are a simplified process flow diagram showing the performance of autonomous widget operations implemented in accordance with an embodiment of the invention to generate an autonomous widget. In various embodiments, a data center monitoring and management console, described in greater detail herein, may be implemented to perform a data center monitoring and management operation, likewise described in greater detail herein. In certain of these embodiments, the data center monitoring and management operation may include an autonomous widget operation.

As used herein, autonomous broadly refers to being able to act independently, without user input. As likewise used herein, a widget broadly refers to a component that enables a user to view information, access information, or perform a function, or a combination thereof. In certain embodiments, a widget may be implemented as a component of a data center monitoring and management console. In certain embodiments, a widget may be implemented to display an information representation element, such as a line graph or a bar chart, or an interaction control element, such as a scroll bar or command button, or a combination of the two, within a graphical user interface (GUI).

Accordingly, as used herein, an autonomous widget broadly refers to a widget implemented to independently enable a user to access information, or perform a function, or both, without the user's input. Likewise, as used herein, an autonomous widget operation broadly refers to any task, function, operation, procedure or process performed to execute a particular autonomous widget upon detection of a data center issue whose associated operational status meets certain predefined, conditional criteria corresponding to the autonomous widget. As likewise used herein, conditional criteria broadly refers to a set of data center asset operational status parameters, combined with Boolean logic operators, that can be implemented to describe the conditions, which if met, will trigger the execution of an associated autonomous widget operation. In certain embodiments, execution of a particular autonomous widget may result in the autonomous retrieval, generation, configuration, population, provision, or display, or some combination thereof, of an associated autonomous widget.

In various embodiments, certain conditional criteria may be defined 402 for an associated autonomous widget. In certain of these embodiments, a data center monitoring and management console may be implemented to receive user input to define 402 the conditional criteria for a particular autonomous widget. As an example, a user may provide input that if the operational temperature of a server, identified by an Internet Protocol (IP) address of 192.200.200.300, exceeds 140 degrees Centigrade for more than two minutes, then a thermal alert bar chart widget should be autonomously displayed within the UI of the data center monitoring and management console. In various embodiments, the data center monitoring and management console may likewise be implemented to perform a particular autonomous widget operation if the conditional criteria 402 matches certain data center issue input data 406 associated with the detection 420 of a corresponding associated data center issue. In these embodiments, the selection of the conditional criteria to be used for a particular autonomous widget, the method by which it is selected, and the determination of what data center issue input data 406 is determined to be a match, is a matter of design choice. In certain embodiments, a data center monitoring and management console may be implemented to define other conditional criteria, either automatically or in response to the user defined conditional criteria.

In various embodiments, a data center monitoring and management console may be implemented to monitor 404 an associated data center monitoring and management environment, described in greater detail herein, for the occurrence of a data center issue, likewise described in greater detail herein. In various embodiments, certain data center issue input data 406 associated with the data center monitoring and management environment may be used to detect 420 a data center issue. In these embodiments, the input data 416 that is selected for monitoring, the method by which it is monitored, and the method by which the data center issue is detected, or a combination thereof, is a matter of design choice.

In various embodiments, the data center issue input data 406 may be implemented to include data center issue input data from individual data center monitoring and management environments 408. In various embodiments, the data center issue input data from individual data center monitoring and management environments 408 may include certain telemetry 410 data, historical 412 data, and target value 414 data associated with a particular data center asset. In certain embodiments, the telemetry 410 data may include information corresponding to the operational status of a particular data center asset. In certain embodiments, the historical 412 data may include information corresponding to a particular data center asset's lifecycle and remediation history. In certain embodiments, the target value 414 data may include information corresponding to certain optimum performance metrics, operating parameters, replacement or maintenance intervals, and so forth.

As an example, the telemetry 410 data may indicate the operating temperature of a server is approaching its upper limit. To continue the example, the historical 412 data may likewise indicate one or more fans within the server may be approaching their mean time before failure (MTBF) specification. To continue the example further, the target value 414 data may provide information related to the optimum operational temperature for the server as well as a preferred service interval for proactively replacing its fans.

In various embodiments, the data center issue input data 406 may be implemented to include data center issue input data gathered across a plurality of data center monitoring and management environments 416. In certain of these embodiments, the data center issue input data gathered across a plurality of data center monitoring and management environments 416 may be processed by the data center monitoring and management console to detect possible data center issue intersections 418. As an example, three different data centers may respectively have an installed base of servers sourced from three different manufacturers.

In this example, servers from two of the manufacturers may be experiencing hard disk failures early in their anticipated lifecycles, while servers from the other manufacturer are not. To continue the example, the servers from the two manufacturers that are experiencing early hard disk failures use drives manufactured by the same manufacturer. Conversely, the servers from the other manufacturer use hard disk drives manufactured by a different manufacturer. Accordingly, the intersection that is detected is that servers from two manufacturers use hard disk drives manufactured by the same manufacturer, and consequently, bot are experiencing early hard disk failures.

In certain embodiments, the data center monitoring and management console may be implemented to process the data center issue input data 406 to detect 420 a particular type of data center issue. In various embodiments, the data center issue input data from individual data center monitoring and management environments 408 may relate used to detect 420 anomalous 422, new 424, low visibility 426, and unresolved 428 data center issues, and pattern recognition 429 thereof. As an example, ten servers, each of which is of the same make, model, and configuration, receive a driver update. As a result, one of the servers crashes, while the other nine do not. In this example, the server that crashes is an anomalous 422 data center issue.

As another example, a router port assigned to a particular server running a particular workload may have performed as expected for nine months, only to unexpectedly begin passing traffic intermittently. Furthermore, the ports of other routers of the same make, model, and configuration do not exhibit the same behavior. In this example, the unexpected intermittent performance of a router port that has been operating properly for an extended period of time is a new 424 data center issue. As yet another example, an individual disk drive in a redundant array of independent disks (RAID) may log infrequent read errors (e.g., an average of three a day). Since the disk drive is part of a RAID array, the other disk drives in the array tend to mask its erratic performance. However, the fact that the read errors are occurring on a regular basis indicate that the disk drive may fail at some point in the future. In this example, the infrequent read errors represent a low visibility 426 data center issue.

As yet still another example, a compressor in a cooling unit may cycle off for short periods of time at random intervals. However, despite best efforts by data center personnel, the cause for its behavior cannot be determined. In this example, the erratic behavior of the compressor is an ongoing unresolved 428 data center issue. As another example, the operational throughput of a server may decline more than twenty percent whenever an associated workflow utilizes more than ninety percent of its currently available memory. In this example, the correlation of the server's throughput to the utilization of its available memory establishes a recognizable data center issue pattern 429.

In various embodiments, the data center issue input data gathered across a plurality of data center monitoring and management environments 416 may be used to detect 420 analogous data center issues that may occur in different data center monitoring and management environments. As a continuation of a previous example, a first data center may deploy ten servers, each of which is of the same make, model, and configuration. In this example, each server receives a driver update. As a result, one of the servers crashes, while the other nine do not. To continue the example, the server that crashes is an anomalous 422 data center issue for the first data center.

To continue the example further, a second data center may likewise deploy ten servers, each of which is of the same make, model, and configuration as in the other data center. Likewise, all ten of the servers receive the same driver update, resulting in one server crashing while the other nine do not. Accordingly, the server that crashes is an anomalous 422 data center issue for the second data center as well.

However, the fact that one server in each data center crashed after receiving the same driver update represents the detection of an analogous 430 data center issue, despite each being an anomalous 422 data center issue for their respective data centers. In this example, the detection of such an analogous 430 data center issue may indicate other factors may have caused the two servers to crash. Accordingly, to continue the example yet further, it may be discovered that both servers were running the same kind of workload, which was incompatible with the server update they both received.

In various embodiments, detection 420 of a data center issue may lead to making a determination 431 whether to use an existing autonomous widget whose conditional criteria matches the data center issue input data 406 associated with the detected 420 data center issue. If so, then an existing autonomous widget is selected 432. Otherwise, if an existing autonomous widget whose conditional criteria matches the data center input data is not present, a new autonomous widget may be generated 436. In various embodiments, generation 436 of a new autonomous widget may involve configuring certain parameters, such as its visualization type 438 (e.g., a bar chart), its time frame (e.g., the last 24 hours), the affected data center assets (e.g., a class of servers), and whether the data used is predictive or historical 444.

In various embodiments, generation 436 of a new autonomous widget may likewise involve defining a deletion rule 446. As used herein, a deletion rule 434 broadly refers to any information processing rule, familiar to skilled practitioners of the art, that can be used, directly or indirectly, in the performance of an autonomous widget operation, described in greater detail herein, to determine under what conditions an autonomous widget is removed from the UI of a data center monitoring and management console. As an example, a deletion rule may be implemented to no longer display the autonomous widget once its associated data center issue is resolved. As another example, a deletion rule may be implemented to persist the display of the autonomous widget until a user deletes its display within the UI of a data center monitoring and management console.

In various embodiments, a new autonomous widget may be generated 436 manually by a user. In certain of these embodiments, the autonomous widget's parameters and deletion rule may respectively be configured and defined manually by the user. In various embodiments, an autonomous widget operation may be implemented to automatically configure certain of a new autonomous widget's parameters, or define its deletion rule, or a combination thereof. In these embodiments, the method by which a new autonomous widget's parameters are automatically configured, or which parameters are selected to be automatically configured, or how its deletion rule if automatically defined, or whether to do so, is a matter of design choice. Skilled practitioners of the art will recognize that many such embodiments and examples are possible. Accordingly, the foregoing is not intended to limit the spirit, scope, or intent of the invention.

In various embodiments, once a new autonomous widget is generated 436, or an existing autonomous widget is selected 432, the autonomous widget is populated 448 with certain data center issue input data 406 associated with the detected 420 data center issue and displayed within the UI of a data center monitoring and management console. In these embodiments, the selection of which data center issue input data 406 is selected to populate 448 the autonomous widget, how the autonomous widget is populated 448 with the data center issue input data 406, and how the autonomous widget may be displayed within the UI of the data center management and monitoring console, is a matter of design choice.

In various embodiments, a determination 450 may be made whether the user has decided to remove the autonomous widget from the UI of a data center monitoring and management console. In certain embodiments, the autonomous widget may be automatically removed 452 from the UI of the data center monitoring and management console once the conditions of its deletion rule are met. In certain embodiments, information related to removal of the UI of the data center monitoring and management console may be provided 454 as feedback for future consideration in defining conditional criteria 402 for an autonomous widget.

As an example, the autonomous widget may have an associated deletion rule that is defined to display the autonomous widget until its associated data center issue is resolved. In this example, the user may decide that the data center issue associated with the autonomous widget is not particularly serious, and as a result, decides to remove the autonomous widget from the UI of the data center monitoring and management console. To continue the example, the information related to the user deciding the data center issue was not that serious may result in redefining the autonomous widget's conditional criteria, or alternatively may be used when defining the conditional criteria for a new autonomous widget. Those of skill in the art will recognize that many such embodiments and examples are possible. Accordingly, the foregoing is not intended to limit the spirit, scope, or intent of the invention.

Figure 5:
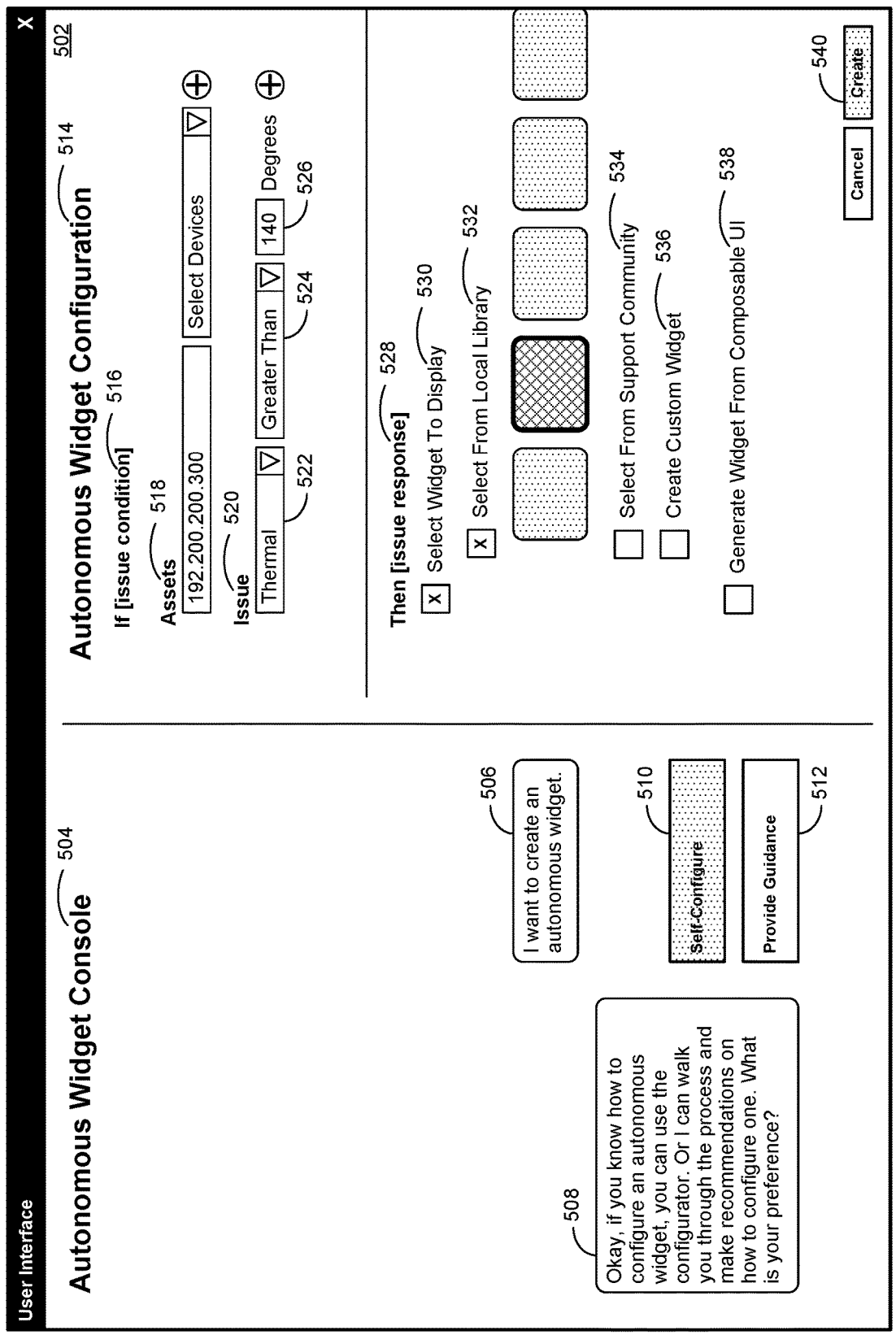
FIG. 5 shows an example screen presentation of a user interface (UI) implemented to generate an autonomous widget.

FIG. 5 shows an example screen presentation of a user interface (UI) implemented in accordance with an embodiment of the invention to generate an autonomous widget. In this embodiment, a data center monitoring and management console UI 502 is implemented to display an autonomous widget console 504 window and an autonomous widget configuration 514 window. As shown in FIG. 5, a user may enter a request, such as "I want to create an autonomous widget" into a user request field 506. In response, the data center monitoring and management console UI 502 may be implemented to respond with a response, such as "Okay, if you know how to configure an autonomous widget, you can use the configurator. Or I can walk you through the process and make recommendations on how to configure one. What is your preference?" within a console response field 508.

In certain embodiments, the data center monitoring and management console UI 502 may be implemented to respond with one or more command buttons, such as "Self-Configure" 510 or "Provide Guidance" 512. In this embodiment, the user selects the "Self-Configure" 510 command button through the use of a user gesture, such as a mouse click. As a result, the autonomous widget configuration 514 window is displayed within the UI 502 of the data center monitoring and management console. As likewise shown in FIG. 5, the autonomous widget configuration 514 window may be implemented to include a "If [issue condition]" 516 sub-window, and a "Then [issue response]" 528 sub-window. In certain embodiments, selections made within the "If [issue condition]" 516 sub-window are used to generate the conditional criteria, described in greater detail herein, for an autonomous widget.

In this embodiment, the "If [condition issue]" 516 sub-window is implemented with an "Assets" 518 drop-down window to present a plurality of data center assets to the user for selection. In certain embodiments, the user may select one or more data center assets to add to the autonomous widget's conditional criteria. For example, as shown in FIG. 5, a data center asset with an Internet Protocol (IP) address of 192.200.200.300 has been selected. In certain embodiments, the "If [condition issue]" 516 sub-window may be implemented with a plurality of "Issue" 518 drop-down and data entry windows. In this embodiment, the plurality of "Issue" 518 drop-down and data entry windows includes an issue class 522 drop-down window, a Boolean operator 524 drop-down window, and a numeric data entry 526 window. Accordingly, as shown in FIG. 5, conditional criteria of "If 516 the data center asset 518 identified by an IP address of 192.200.200.300 experiences a data center issue 520 corresponding to a thermal reading 522 greater than 524 one hundred and forty degrees 526" can be defined for the autonomous widget.

In certain embodiments, selections made within the "Then [issue response]" 528 sub-window are used to determine which autonomous widget to display within the UI of a data center monitoring and management console when the conditional criteria configured in the "If [issue condition]" 516 are met. In certain embodiments, the "Then [issue response]" 528 may be implemented to provide a "Select Widget To Display" 530 selection and a "Generate Widget From Composable UI" 538 selection. In certain embodiments, the "Select Widget To Display" 530 selection may be further implemented to provide a "Select From Local Library" 532 selection, a "Select From Support Community" 534 selection, and a "Create Custom Widget" 536 selection.

In certain embodiments, one or more existing autonomous widgets that are locally stored may be displayed for selection as a result of the user selecting the "Select From Local Library" 532 selection. In certain embodiments, the user can select which of the locally-stored autonomous widgets they may want to associate with the conditional criteria defined in the "If [condition issue]" 516 sub-window through the use of a user gesture, such as a mouse click. In certain embodiments, one or more existing autonomous widgets that are available from a support community may be displayed for selection as a result of the user selecting the "Select From Local Library" 532 selection. In certain embodiments, the user can select which of the support community widgets they may want to associate with the conditional criteria defined in the "If [condition issue]" 516 sub-window through the use of a user gesture, such as a mouse click.

In certain embodiments, a custom autonomous widget (not shown) may be created by selecting the "Create Custom Widget" 536 selection. In certain embodiments, an autonomous widget may be automatically generated by selecting the "Generate Widget From Composable UI" 538 selection. In various embodiments, selecting the "Generate Widget From Composable UI" 538 selection may result in the performance of an autonomous widget operation being performed to automatically generate an autonomous widget from certain data center issue input data, described in greater detail herein. In these embodiments, the data center issue input data used to generate the autonomous widget, and the method by which it is generated, is a matter of design choice. As shown in FIG. 5, selecting the "Create" 540 command button within the data center monitoring and management console UI 502 results in the selections made in the "If [issue condition]" 516 sub-window, and the "Then [issue response]" 528 sub-window being used to generate an autonomous widget.

Figure 6:
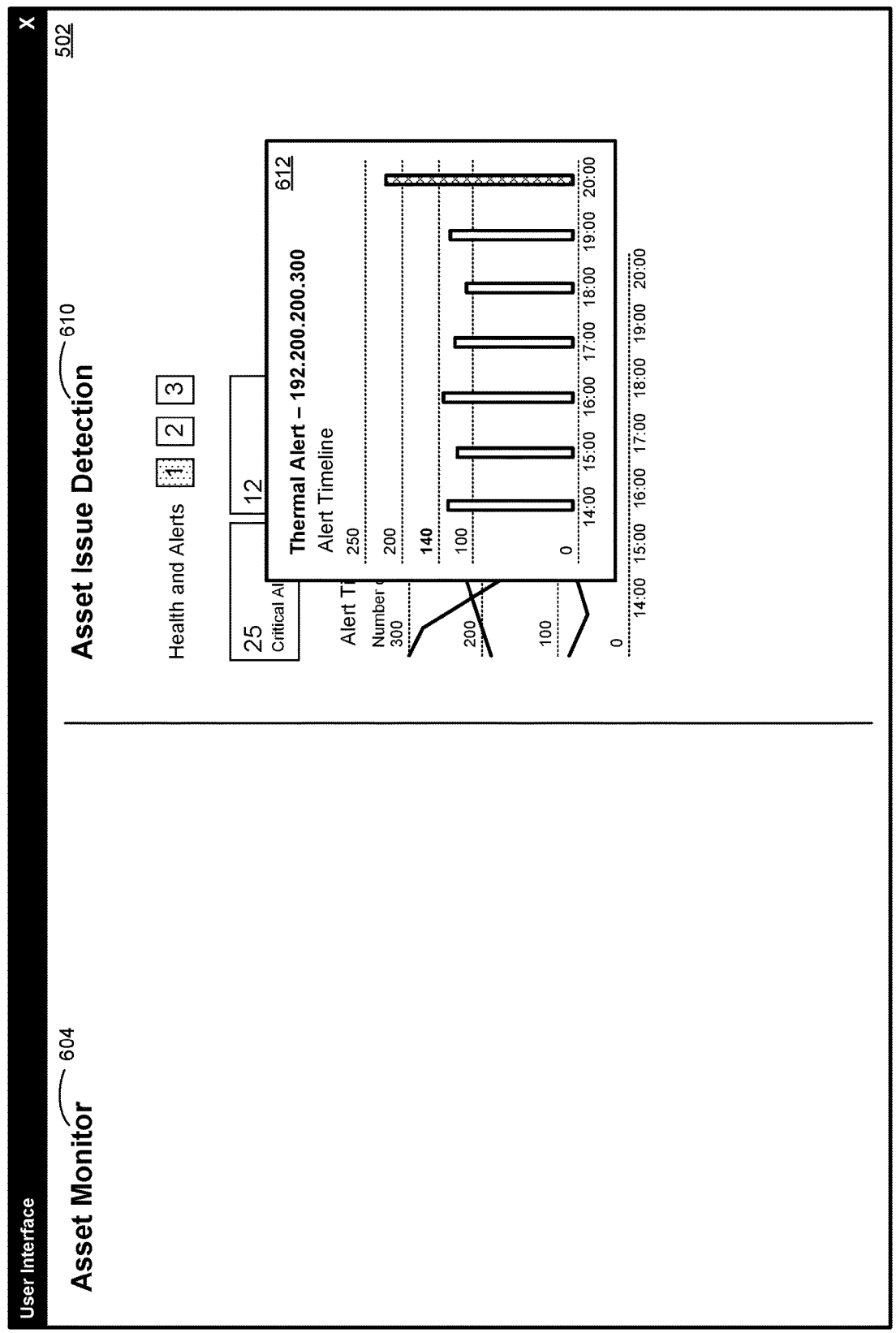
FIG. 6 shows an example screen presentation of a UI implemented to display an autonomous widget when its conditional criteria is matched by a corresponding data center issue.

FIG. 6 shows an example screen presentation of a user interface (UI) implemented in accordance with an embodiment of the invention to display an autonomous widget when its conditional criteria is matched by data center asset input data corresponding to an associated data center issue. In this embodiment, a data center monitoring and management console UI 502 is implemented to display an asset monitor 604 window and an asset issue detection 610 window. As shown in FIG. 6, an autonomous widget 612 is implemented to be displayed within the asset issue detection 610 window, when its conditional criteria is matched by data center asset input data corresponding to an associated data center issue.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a data center monitoring and management operation, comprising:
    monitoring data center assets within a data center;
    identifying an issue within the data center, the issue being associated with an operational situation associated with a particular component of the data center;
    determining whether data associated with the issue corresponds to a predefined conditional criteria;
    triggering an autonomous widget operation in response to a determination of the data associated with the issue corresponding to the predefined conditional criteria, the autonomous widget operation executing a particular autonomous widget;
    determining whether to use an existing autonomous widget when the predefined conditional criteria matches the data center issue input data associated with a detected data center issue of the existing autonomous widget is present; and,
    generating a new autonomous widget when the existing autonomous widget having the predefined conditional criteria matching the data center input data associated with the detected data center issue is not present.

2. The computer-implementable method of claim 1, wherein:
    the predefined conditional criteria comprise a set of data center asset operational status parameters.

3. The computer-implementable method of claim 2, wherein:
the set of data center asset operational status parameters are combined with Boolean logic operators to describe a data center condition.

4. The computer-implementable method of claim 1, further comprising:
defining certain conditional criteria for an associated autonomous widget, the certain conditional criteria being defined by one of user input and a data center management module.

5. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
monitoring data center assets within a data center;
identifying an issue within the data center, the issue being associated with an operational situation associated with a particular component of the data center;
determining whether data associated with the issue corresponds to a predefined conditional criteria;
triggering an autonomous widget operation in response to a determination of the data associated with the issue corresponding to the predefined conditional criteria, the autonomous widget operation executing a particular autonomous widget;
determining whether to use an existing autonomous widget when the predefined conditional criteria matches the data center issue input data associated with a detected data center issue of the existing autonomous widget is present; and,
generating a new autonomous widget when the existing autonomous widget having the predefined conditional criteria matching the data center input data associated with the detected data center issue is not present.

6. The system of claim 5, wherein:
the predefined conditional criteria comprise a set of data center asset operational status parameters.

7. The system of claim 6, wherein:
the set of data center asset operational status parameters are combined with Boolean logic operators to describe a data center condition.

8. The system of claim 5, wherein the instructions executable by the processor are further configured for:
defining certain conditional criteria for an associated autonomous widget, the certain conditional criteria being defined by one of user input and a data center management module.

9. A non-transitory, computer-readable storage medium embodying computer program code, the computer program code comprising computer executable instructions configured for:
monitoring data center assets within a data center;
identifying an issue within the data center, the issue being associated with an operational situation associated with a particular component of the data center;
determining whether data associated with the issue corresponds to a predefined conditional criteria;
triggering an autonomous widget operation in response to a determination of the data associated with the issue corresponding to the predefined conditional criteria, the autonomous widget operation executing a particular autonomous widget;
determining whether to use an existing autonomous widget when the predefined conditional criteria matches the data center issue input data associated with a detected data center issue of the existing autonomous widget is present; and,
generating a new autonomous widget when the existing autonomous widget having the predefined conditional criteria matching the data center input data associated with the detected data center issue is not present.

10. The non-transitory, computer-readable storage medium of claim 9, wherein:
the predefined conditional criteria comprise a set of data center asset operational status parameters.

11. The non-transitory, computer-readable storage medium of claim 10, wherein:
the set of data center asset operational status parameters are combined with Boolean logic operators to describe a data center condition.

12. The non-transitory, computer-readable storage medium of claim 10, wherein the computer executable instructions are further configured for:
defining certain conditional criteria for an associated autonomous widget, the certain conditional criteria being defined by one of user input and a data center management module.

13. The non-transitory, computer-readable storage medium of claim 9, wherein:
the computer executable instructions are deployable to a client system from a server system at a remote location.

14. The non-transitory, computer-readable storage medium of claim 9, wherein:
the computer executable instructions are provided by a service provider to a user on an on-demand basis.

* * * * *